(12) United States Patent
Goswami et al.

(10) Patent No.: US 12,357,517 B2
(45) Date of Patent: Jul. 15, 2025

(54) GYROSCOPE ASSISTED HELICOPTER RESCUE LIFT SYSTEMS AND METHODS

(71) Applicant: Hornet AcquisitionCo, LLC, Vancouver, WA (US)

(72) Inventors: Biplav Bijoy Goswami, Bangalore (IN); Girish Channakeshavrao Hirekerur, Bengaluru (IN)

(73) Assignee: HORNET ACQUISITIONCO, LLC, Vancouver, WA (US)

( * ) Notice: Subject to any disclaimer, the term of this patent is extended or adjusted under 35 U.S.C. 154(b) by 120 days.

(21) Appl. No.: 17/752,123

(22) Filed: May 24, 2022

(65) Prior Publication Data

US 2023/0149232 A1    May 18, 2023

(30) Foreign Application Priority Data

Nov. 12, 2021  (IN) .............................. 202141051909

(51) Int. Cl.
*A61G 1/06* (2006.01)
*B64D 1/22* (2006.01)

(52) U.S. Cl.
CPC ................. *A61G 1/06* (2013.01); *B64D 1/22* (2013.01); *A61G 2203/36* (2013.01); *A61G 2203/38* (2013.01); *A61G 2220/10* (2013.01)

(58) Field of Classification Search
CPC .. B64D 1/22; A61G 2203/36; A61G 2220/10; A61G 1/00; B66C 13/08; Y10S 200/19; Y10T 74/12; Y10T 74/1229
See application file for complete search history.

(56) References Cited

U.S. PATENT DOCUMENTS

| 5,871,249 | A  |   | 2/1999  | Williams |
|-----------|----|---|---------|----------|
| 6,571,652 | B2 | * | 6/2003  | Adcock ................... F16H 33/10 74/5.9 |
| 8,601,619 | B2 |   | 12/2013 | McNulty |
| 9,114,907 | B2 |   | 8/2015  | Maas et al. |
| 9,144,526 | B2 | * | 9/2015  | Hyde ................... B60G 21/002 |
| 10,870,558 | B2 |  | 12/2020 | Sikora et al. |

(Continued)

FOREIGN PATENT DOCUMENTS

| CN | 110001667 |    | 7/2019 |
| CZ | 29968 U1  | *  | 11/2016 |

(Continued)

OTHER PUBLICATIONS

Mario Pierobon, "Spinning Avoidance", AirMed&Rescue.com, https://www.airmedandrescue.com/latest/long-read/spinning-avoidance, Issue 95 | Apr. 2019, Apr. 15, 2019, 14 pages.

(Continued)

*Primary Examiner* — Justin C Mikowski
*Assistant Examiner* — Deborah Talitha Gedeon
(74) *Attorney, Agent, or Firm* — SNELL & WILMER L.L.P.

(57) ABSTRACT

A patient litter basket spin control assembly includes a first gyroscope and a motion sensor for sensing an angular acceleration of a patient litter basket. The first gyroscope generates a counter torque to the litter basket to slow the angular acceleration of the litter basket to provide stabilization. The first gyroscope and a second gyroscope may be configured as a pair and located at opposite ends of the litter basket.

18 Claims, 11 Drawing Sheets

(56) References Cited

U.S. PATENT DOCUMENTS

| | | | | |
|---|---|---|---|---|
| 2002/0170368 | A1* | 11/2002 | Adcock | F16H 33/10 74/5.4 |
| 2010/0242169 | A1* | 9/2010 | McNulty | A61G 7/1032 5/81.1 HS |
| 2015/0084320 | A1* | 3/2015 | Hyde | B60G 21/08 280/755 |
| 2017/0336807 | A1* | 11/2017 | Ala | B64C 19/00 |
| 2019/0359453 | A1 | 11/2019 | Al-Husseini et al. | |
| 2020/0222257 | A1* | 7/2020 | Sikora | G06F 18/2113 |
| 2021/0038446 | A1 | 2/2021 | Tyler | |

FOREIGN PATENT DOCUMENTS

| | | | | |
|---|---|---|---|---|
| JP | 6867634 | | 4/2021 | |
| KR | 101553822 | B1 * | 9/2015 | |
| WO | WO-2021016192 | A2 * | 1/2021 | A61G 1/00 |

OTHER PUBLICATIONS

Meg O'Connor, "Hiker From Viral Helicopter Rescue Files $2M Claim Against the City", Phoenix New Times, https://www.phoenixnewtimes.com/news/hiker-from-viral-helicopter-rescue-files-2m-claim-against-the-city-11401326, Nov. 27, 2019, 5 pages.

Screen captures from Youtube video clip entitled, "Helicopter rescue of injured hiker in Arizona spins out of control", "Guardian News", https://youtu.be/yhKZCy41g5w, uploaded Jun. 4, 2019 by user, Retrieved from Internet on Sep. 12, 2022, 6 pages.

Screen captures from Youtube video clip entitled, "Seakeeper: How It Works—Small Boats", "Seakeeper", https://youtu.be/hFI7v7s4w24, uploaded Nov. 9, 2018 by user, Retrieved from Internet on Sep. 12, 2022, 7 pages.

European Patent Office, European Search Report dated Mar. 14, 2023 in Application No. 22207132.6.

* cited by examiner

GYROSCOPE ASSISTED HELICOPTER RESCUE LIFT SYSTEMS AND METHODS

CROSS-REFERENCE TO RELATED APPLICATIONS

This application claims priority to, and the benefit of, India Patent Application No. 202141051909, filed Nov. 12, 2021 (DAS Code DB09) and titled "GYROSCOPE ASSISTED HELICOPTER RESCUE LIFT SYSTEMS AND METHODS," which is incorporated by reference herein in its entirety for all purposes.

FIELD

The present disclosure relates to helicopter rescue hoist systems and, more specifically, to a patient litter basket with spin control functions.

BACKGROUND

The use of helicopters and other aircraft is well known and commonly utilized for rescuing and transporting injured or ill patients who may be located in an area which is difficult to access in the normal course, due to the absence of roads or adequate pathways leading to and from such area. Even where access is available, a helicopter rescue or transport may be needed where the patient needs to be transported to a hospital in less time than it would take for water or land operated forms of transportation, such as in ambulances.

Helicopter rescue of patients is typically accomplished by landing the helicopter nearby the person needing attention. However, there may be many instances where there is no suitable landing site or pad for the helicopter, and the patient must be reached and placed in the helicopter while the helicopter continues to remain airborne, hovering near the pickup site. In such instances, a typical manner for rescue is to lower a patient litter basket from the helicopter by means of a hoist, when the helicopter is more or less directly overhead or nearby the patient. The hoist may comprise a cable which is unreeled, the cable having a hook, swivel or other mechanical structure at its one end by means of which the patient litter basket is attached thereto. There may be a plurality of cables between the hook, swivel or other mechanical structure and the patient litter basket itself, in order to provide more stability to the patient litter basket.

One issue in such rescues relates to the possibility that the patient litter basket may begin to spin uncontrollably, which may be the result of ambient wind and weather conditions (such as fire driven windstorms), or the downdraft of the helicopter rotor itself. While a small amount of spin induced by such conditions may not be a problem, the induced spin may accelerate and increase so that the number of revolutions of the litter basket per minute becomes at least unpleasant for the patient, sometimes inducing sickness, and often dangerous to the patient or the rescue operation.

SUMMARY

A patient litter basket spin control assembly is disclosed, comprising a first gyroscope, and a motion sensor for sensing an angular acceleration of a patient litter basket. The first gyroscope is configured to generate a counter torque in a rotational direction to slow the angular acceleration of the patient litter basket.

In various embodiments, the patient litter basket spin control assembly further comprises a controller associated with the first gyroscope.

In various embodiments, the patient litter basket spin control assembly further comprises a second gyroscope, wherein the first gyroscope and the second gyroscope form a first gyroscope pair configured to be simultaneously activated to generate the counter torque.

In various embodiments, the first gyroscope and the second gyroscope are configured to be coupled opposite each other with respect to the patient litter basket.

In various embodiments, the patient litter basket spin control assembly further comprises a second gyroscope pair comprising a third gyroscope and a fourth gyroscope, wherein the first gyroscope and the second gyroscope are configured to be disposed at opposite ends of the patient litter basket and the third gyroscope and the fourth gyroscope are configured to be disposed at opposite sides of the patient litter basket.

In various embodiments, the first gyroscope comprises a flywheel configured to rotate about an axis to generate the counter torque.

In various embodiments, the patient litter basket spin control assembly further comprises a power source associated with the first gyroscope.

In various embodiments, the patient litter basket spin control assembly further comprises the patient litter basket, wherein the first gyroscope and the motion sensor are mounted to the patient litter basket.

A patient litter basket assembly is disclosed, comprising a litter basket configured to be raised and lowered by a helicopter using a cable, a first gyroscope pair comprising a first gyroscope and a second gyroscope, and a motion sensor for sensing an angular acceleration of the litter basket, the first gyroscope pair configured to generate a counter torque in a rotational direction to slow the angular acceleration of the litter basket.

In various embodiments, the patient litter basket spin control assembly further comprises a second gyroscope pair comprising a third gyroscope and a fourth gyroscope.

In various embodiments, the first gyroscope and the second gyroscope are configured to be disposed at opposite ends of the litter basket.

In various embodiments, the third gyroscope and the fourth gyroscope are configured to be disposed at opposite sides of the litter basket.

In various embodiments, the second gyroscope pair is configured to be located substantially midway between a first end and a second end of the patient litter basket.

In various embodiments, the first gyroscope comprises a first flywheel configured to rotate about a first flywheel rotation axis, the second gyroscope comprises a second flywheel configured to rotate about a second flywheel rotation axis in a rotational direction opposite the first flywheel, and the first flywheel rotation axis is parallel to the second flywheel rotation axis.

In various embodiments, the third gyroscope comprises a third flywheel configured to rotate about a third flywheel rotation axis, the fourth gyroscope comprises a fourth flywheel configured to rotate about a fourth flywheel rotation axis in a rotational direction opposite the third flywheel, and the third flywheel rotation axis is parallel to the fourth flywheel rotation axis.

In various embodiments, the patient litter basket spin control assembly further comprises a power source for powering the first gyroscope and the motion sensor.

In various embodiments, at least one of the first gyroscope and the second gyroscope is mounted to a sidewall of the litter basket.

In various embodiments, at least one of the first gyroscope and the second gyroscope is disposed at least partially within a sidewall of the litter basket.

In various embodiments, at least one of the first gyroscope and the second gyroscope is mounted to a base of the litter basket.

A method for stabilizing a patient litter basket is disclosed, the method comprising detecting an angular acceleration of the patient litter basket, determining that the angular acceleration of the patient litter basket is greater than a predetermined threshold angular acceleration, and activating a first gyroscope to counter act a torque of the patient litter basket by generating a gyroscopic counter torque.

In various embodiments, the method further comprises simultaneously activating the first gyroscope and a second gyroscope to counter act the torque of the patient litter basket, wherein the gyroscopic counter torque comprises a sum of a first torque generated by the first gyroscope and a second torque generated by the second gyroscope.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
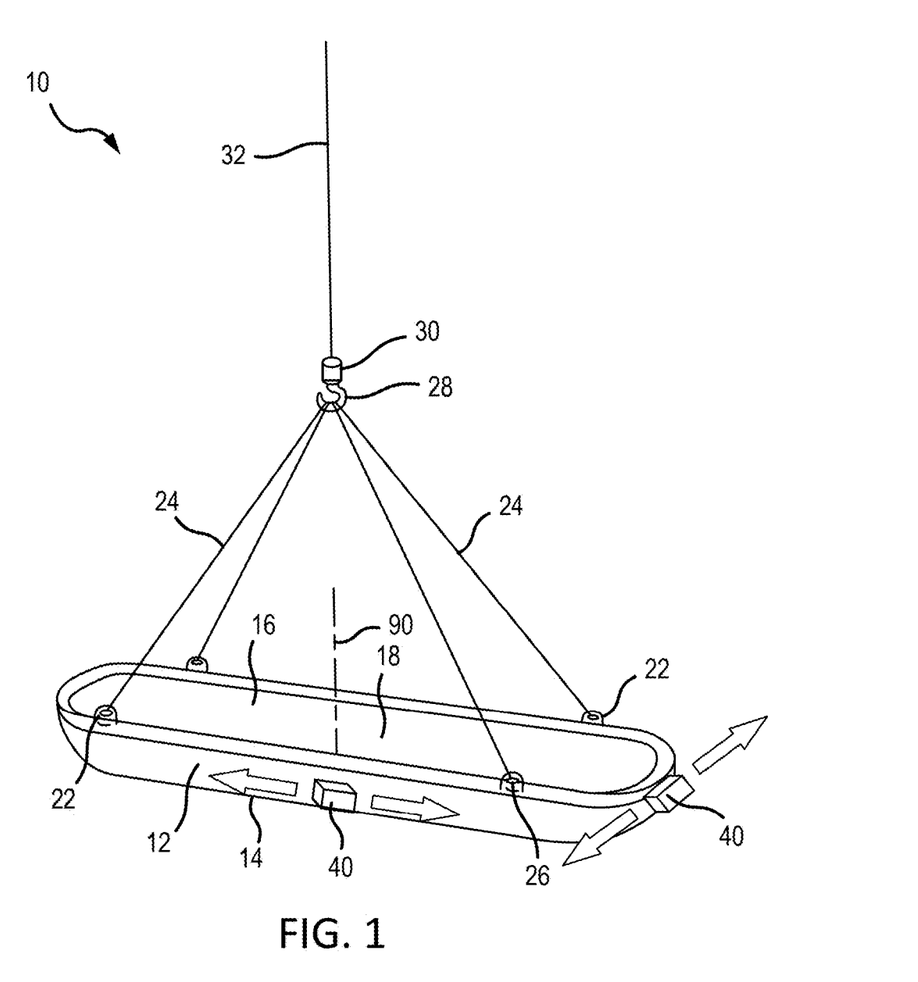
FIG. 1 illustrates a perspective view of a patient litter basket assembly in accordance with various embodiments of the present disclosure.

With reference to FIG. 1, a rescue basket assembly 10 (also referred to as a litter basket assembly) is illustrated, in accordance with various embodiments of the present disclosure. The assembly 10 includes a patient litter basket 12, of elongate size and a somewhat narrower width, with a base 14 and sidewalls 16 defining a patient space 18. The patient or person space 18 is of sufficient size to allow such person to be placed in the patient litter basket 12 in a supine position, and there may be appropriate contours, securing straps, mattresses or padding, and other structures to properly secure the person within the patient litter basket 12 in a secure and comfortable position.

The patient litter basket 12 may include a pair of connecting tabs 22 on each of the longitudinal side edges thereof. Other forms of connection besides connecting tabs may be provided on the patient litter basket 12 illustrated, in accordance with various embodiments of the present disclosure. A connector cable 24 may be secured in an aperture 26 of each of the connecting tabs 22, and extends to a hook 28 with a swivel 30. The hook 28 with swivel 30 is attached to a hoist line 32 at one end thereof. At the other end, the hoist line 32 is attached to a hoist drum or spool (not shown) which, in conventional fashion, can be rotated either by hand manually or, more conventionally in larger applications, by a hoist motor where the loads are heavier. The hoist spool is therefore able to raise and lower the hoist line 32 and the attached swivel 30 with hook 28 at the other end. It should be appreciated that each of the connector cables 24 may be attached to hoist line 32 via other known attachment devices other than swivel 30 and/or hook 28 (e.g., via a shackle, etc.) without departing from the scope of the present disclosure.

In various embodiments, assembly 10 includes one or more gyroscopes 40 to counteract spinning options of the patient litter basket 12. It should be understood that gyroscopes 40 are schematically illustrated in FIG. 1 and that the positioning of gyroscopes 40 with respect to the patient litter basket 12 is not limited as such. In various embodiments, the gyroscopes 40 are mounted to sidewalls 16 to increase the distance between yaw axis 90 and gyroscopes 40, thereby increasing the mass moment of inertia of the gyroscope assembly imparted to patient litter basket 12 about yaw axis 90. In various embodiments, gyroscopes 40 are mounted to sidewalls 16. In various embodiments, gyroscopes 40 are mounted to the outside of sidewalls 16. In various embodiments, gyroscopes 40 are at least partially embedded within sidewalls 16. In various embodiments, gyroscopes 40 are mounted to base 14. In various embodiments, gyroscopes 40 are mounted to the bottom of patient litter basket 12 (e.g., to base 14). Moreover, gyroscopes 40 may be least partially embedded within base 14.

With reference to FIG. 2A through FIG. 2D, various schematic views of a patient litter basket assembly 110 including a patient litter basket 112 with a four gyroscope based configuration are illustrated, in accordance with various embodiments. In various embodiments, patient litter basket 112 may be similar to patient litter basket 12 of FIG. 1.

Patient litter basket 112 may include a first pair of gyroscopes including a first gyroscope 151 and a second gyroscope 152 located at opposite sides of the patient litter basket 112. For example, first gyroscope 151 may be located at first side 161 of patient litter basket 112 and second gyroscope 152 may be located at second side 162 of patient litter basket 112. In various embodiments, first gyroscope 151 and second gyroscope 152 are located substantially midway between the ends (i.e., first end 163 and second end 164) of patient litter basket 112. For example, first gyroscope 151 and second gyroscope 152 may be located between 40% and 60% of the way between first end 163 and second end 164. In various embodiments, first gyroscope 151 and second gyroscope 152 are located half way between first end 163 and second end 164. First gyroscope 151 and second gyroscope 152 may be simultaneously activated to counteract a spinning motion of the patient litter basket 112.

Patient litter basket 112 may include a second pair of gyroscopes including a third gyroscope 153 and a fourth gyroscope 154 located at opposite ends of the patient litter basket 112. For example, third gyroscope 153 may be located at first end 163 of patient litter basket 112 and fourth gyroscope 154 may be located at second end 164 of patient litter basket 112. In various embodiments, third gyroscope 153 and fourth gyroscope 154 are located substantially midway between the sides (i.e., first side 161 and second side 162) of patient litter basket 112. For example, third gyroscope 153 and fourth gyroscope 154 may be located between 40% and 60% of the way between first side 161 and second side 162. In various embodiments, third gyroscope 153 and fourth gyroscope 154 are located half way between first side 161 and second side 162. Third gyroscope 153 and fourth gyroscope 154 may be simultaneously activated to counteract a spinning motion of the patient litter basket 112.

The gyroscope pairs are configured to counteract a spinning motion of the patient litter basket 112. For example, if the patient litter basket 112 starts to spin about the yaw axis 190 in a first rotational direction, the gyroscope pairs (e.g., first gyroscope 151 and second gyroscope 152 and/or third gyroscope 153 and fourth gyroscope 154) may be activated to provide a counter torque in a second rotational direction and prevent spinning. In various embodiments, the counter torque may be incrementally increased or decreased according to the spin rate of the patient litter basket 112.

In various embodiments, the gyroscope pairs are configured to counteract a spinning motion of the patient litter basket 112 about the yaw axis 190. The gyroscope pairs may be further configured to counteract a spinning motion of the patient litter basket 112 about the roll axis 192 and/or the pitch axis 194. It will be appreciated that the torque imparted by each gyroscope will be based upon the orientation of the flywheel associated with the gyroscope. For example, each gyroscope may comprise a single flywheel that can be oriented in various directions, in accordance with various embodiments, or a plurality of flywheels each oriented in a fixed direction and dedicated to counteract rotation in a predetermined rotational direction, in accordance with various embodiments. In various embodiments, each gyroscope comprises a single flywheel oriented in a fixed direction.

In various embodiments, each gyroscope's construction includes a flywheel which is configured to spin and rotate about the axis of precession (e.g., the Z-axis). For example, in response to the flywheel being activated to spin about X-axis and torque is applied to rotate about axis of precession, the flywheel also exerts an equal and opposite torque to the gyroscope frame (which is connected to the patient litter basket 112) due to conservation of angular momentum. Thus, if a single gyroscope is installed to counter act the spinning of patient litter basket 112 about the yaw axis 190, the patient litter basket 112 may tend to experience rotation about X & Z axes, which may compromise the stability of the patient litter basket 112. For this reason, patient litter basket assembly 110 may include two gyroscope pairs to provide the desired counter torque for a spinning basket, without compromising the stability of the basket and ensuring heightened safety.

The logic shown in the below table demonstrates the different axes of rotation of the gyroscopes. As seen, the net reaction torque on the patient litter basket 112 by the gyroscopes is zero. This ensures stability in the roll and pitch axes. Thus, all gyroscopes may work in tandem to produce net torque to counter the spin of the patient litter basket 112. The control system may apply corrective forces, being consistent with the below logic to ensure stability at every instant of a rescue operation.

TABLE 1

Gyroscope control logic for yaw axis stabilization

| Gyroscope | Flywheel Rotation Axis, $\omega$ | Axis of Precession, $\omega_p$ | Gyroscopic Torque Axis | Reaction Torque on Basket |
|---|---|---|---|---|
| Gyroscope 1 | +X | +Z | -Y | -Z |
| Gyroscope 2 | -X | -Z | -Y | +Z |
| Gyroscope 3 | +X | +Z | -Y | -Z |
| Gyroscope 4 | -X | -Z | -Y | +Z |
| Net Torque/Moment | 0 | 0 | -4Y | 0 |

Providing four gyroscopes may ensure robust control of the patient litter basket 112 at all times. Moreover, more complex stability algorithms can be employed. Unexpected loading scenarios such as gust loading, vortex ring state effects while flying in ridges and valleys, and flying through down draught on a side of a mountain, which may each lead to instabilities, can be handled more effectively. A four gyroscope configuration may tend to be more suitable for high risk applications.

Figure 3:
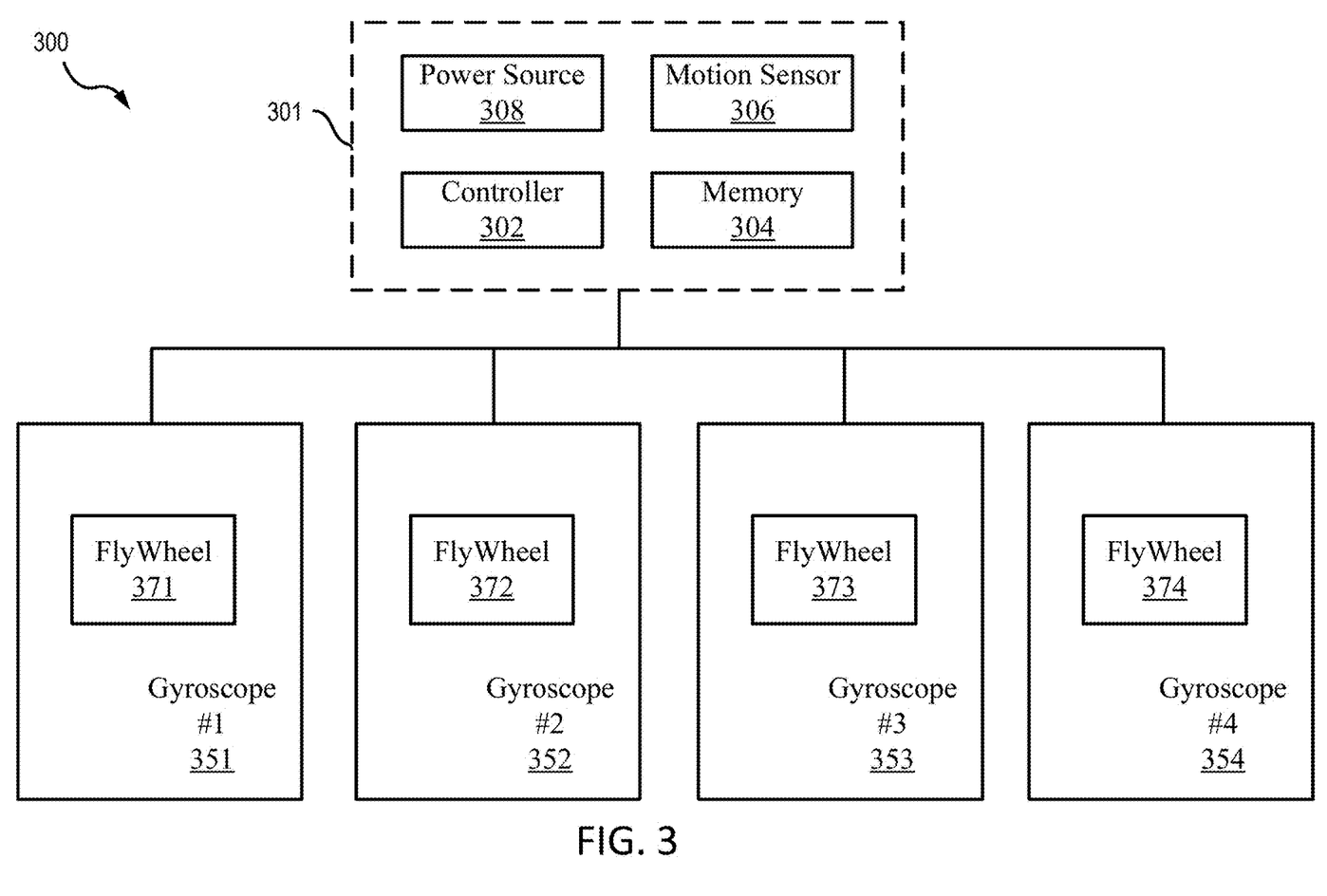
FIG. 3 illustrates a schematic view of a patient litter basket control assembly in accordance with various embodiments of the present disclosure.
Figure 4A:
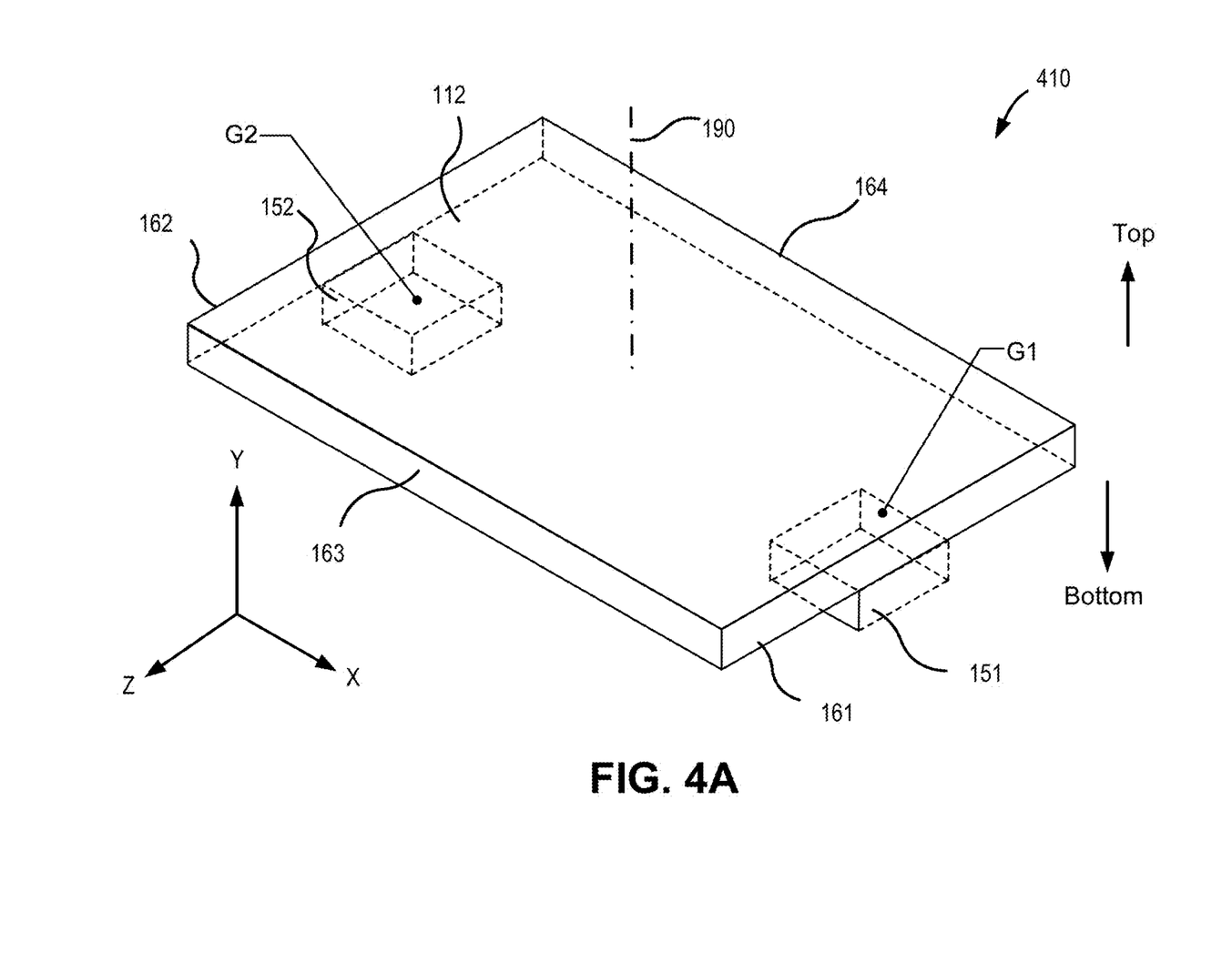
FIG. 4A, FIG. 4B, FIG. 4C, and FIG. 4D illustrate a perspective view, a bottom view, a side view, and a front view, respectively, of a patient litter basket assembly including a two gyroscope design in accordance with various embodiments of the present disclosure.
Figure 4B:
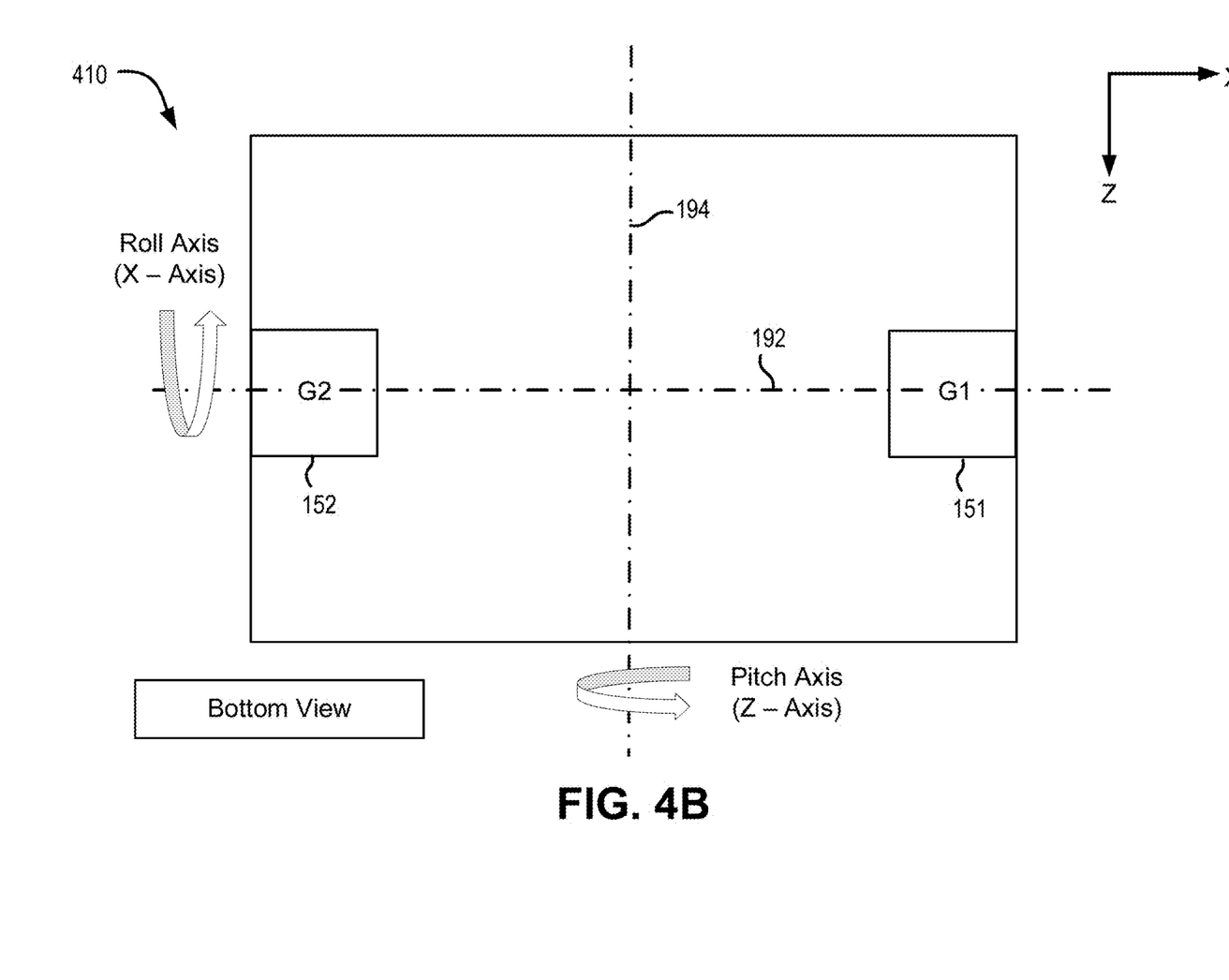
Figure 4C:
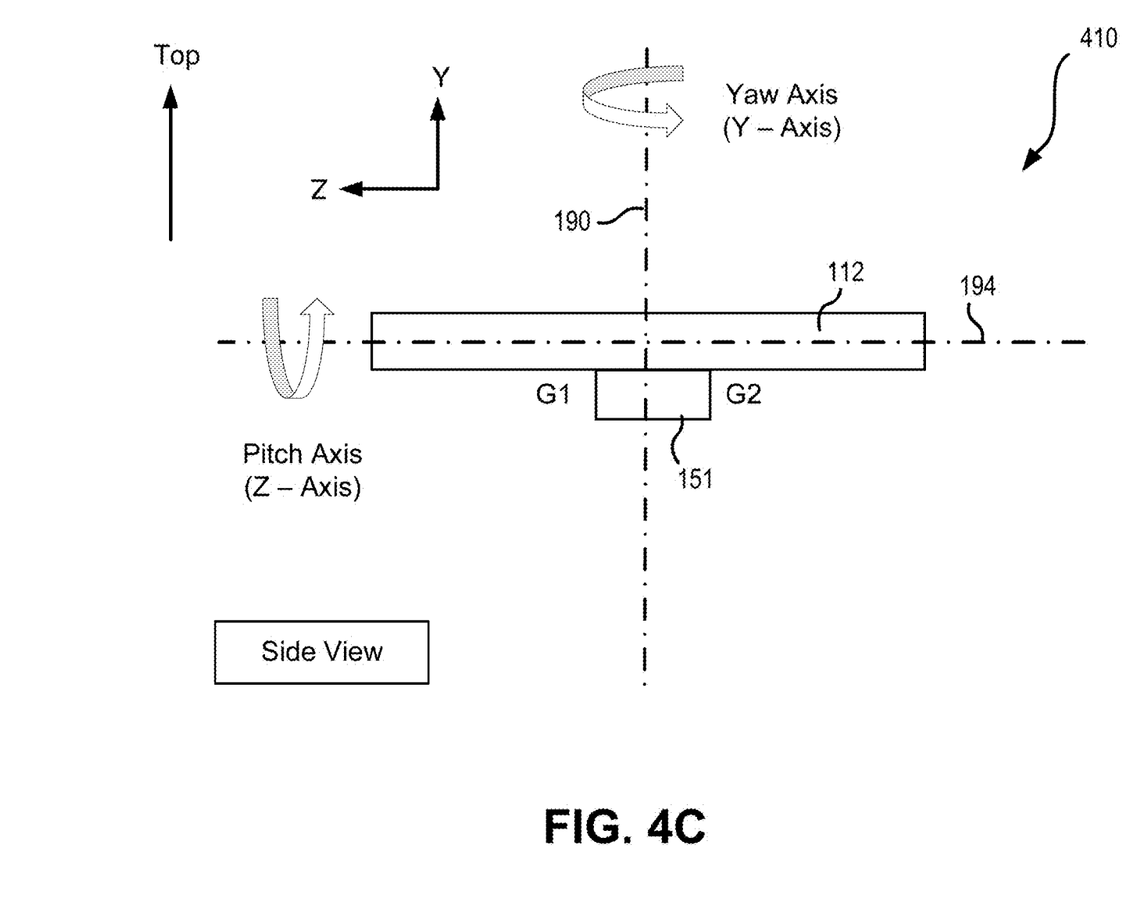
Figure 4D:
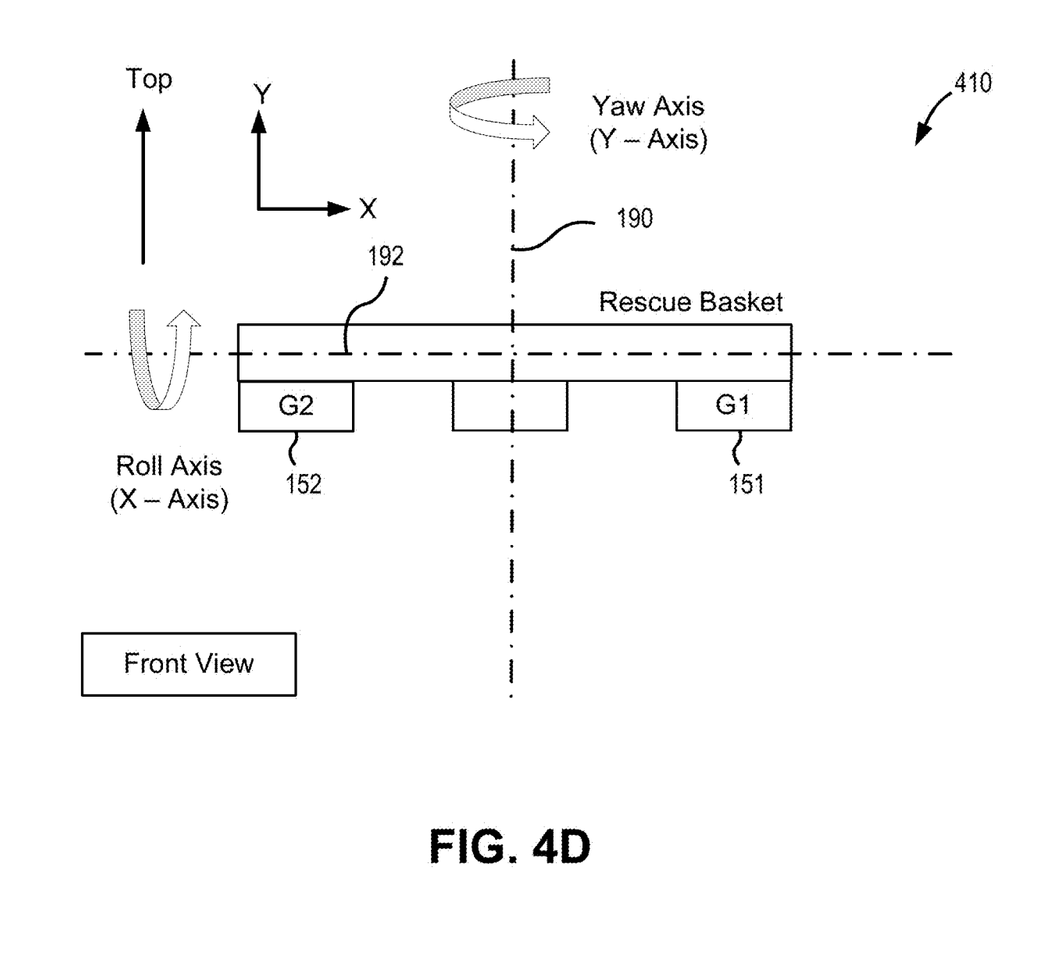

With reference to FIG. 3, a schematic view of a gyroscope assisted control system 300 for controlling the gyroscopes and performing stabilization functions for a patient litter basket during rescue operations, is illustrated, in accordance with various embodiments. In various embodiments, the control system 300 comprises a main control system 301 and a plurality of gyroscopes (e.g., first gyroscope 351, second gyroscope 352, third gyroscope 353, fourth gyroscope 354). Although illustrated as including four gyroscopes, the number of gyroscopes of a control system 300 is not limited in this regard. For example, control system 300 may comprise only two gyroscopes, or may comprise other quantities of gyroscopes. Moreover, although illustrated as comprising a main control system 301, it is contemplated herein that each gyroscope may have its own dedicated control system. For example, each gyroscope may include its own controller, memory, power source, motion sensor, and any combination thereof.

In various embodiments, the main control system 301 includes a controller 302 and a memory 304 (e.g., a database or any appropriate data structure; hereafter "memory 304" also may be referred to as "database 304"). The controller 302 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controller 302 may utilize one or more processors of any appropriate type/configuration, may utilize any appropriate processing architecture, or both). In various embodiments, the controller 302 may further include any non-transitory memory known in the art. The memory 304 may store instructions usable by the logic device to perform operations. Any appropriate computer-readable type/configuration may be utilized as the memory 304, any appropriate data storage architecture may be utilized by the memory 304, or both. In various embodiments, controller 302 may comprise a PID controller for stabilizing the litter basket.

The database 304 may be integral to the control system 301 or may be located remote from the control system 301. The controller 302 may communicate with the database 304 via any wired or wireless protocol. In that regard, the controller 302 may access data stored in the database 304. In various embodiments, the controller 302 may be integrated into computer systems onboard an aircraft. Furthermore, any number of conventional techniques for electronics configuration, signal processing and/or control, data processing and the like may be employed. Also, the processes, functions, and instructions may include software routines in conjunction with processors, etc.

System program instructions and/or controller instructions may be loaded onto a non-transitory, tangible computer-readable medium having instructions stored thereon that, in response to execution by the processor, cause the controller 302 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The instructions stored on the memory 304 of the controller 302 may be configured to perform various operations, such as performing patient litter basket stabilization by operating one or more of gyroscopes 351, 352, 353, 354.

In various embodiments, the main control system 301 from FIG. 3 further comprises a motion sensor 306. Motion sensor 306 may be mounted to a patient litter basket (e.g., patient litter basket 12 of FIG. 1) to detect an orientation of the patient litter basket. Motion sensor 306 may be an accelerometer, or any other suitable motion sensor suitable for detecting an orientation and/or acceleration of patient litter basket 12.

In various embodiments, the main control system 301 from FIG. 3 further comprises a power source 308. The power source 308 may comprise any power source known in the art, such as a battery, a solar source, an alternating current (AC) source, a direct current (DC) source, a rechargeable source, or the like. In various embodiments, a single power source 308 is provided for all gyroscopes. In various embodiments, each gyroscope 351, 352, 353, 354 includes a dedicated power source 308. In various embodiments, each gyroscope pair (e.g., gyroscopes 351, 352 and gyroscopes 353, 354) includes a dedicated power source 308.

Figure 2A:
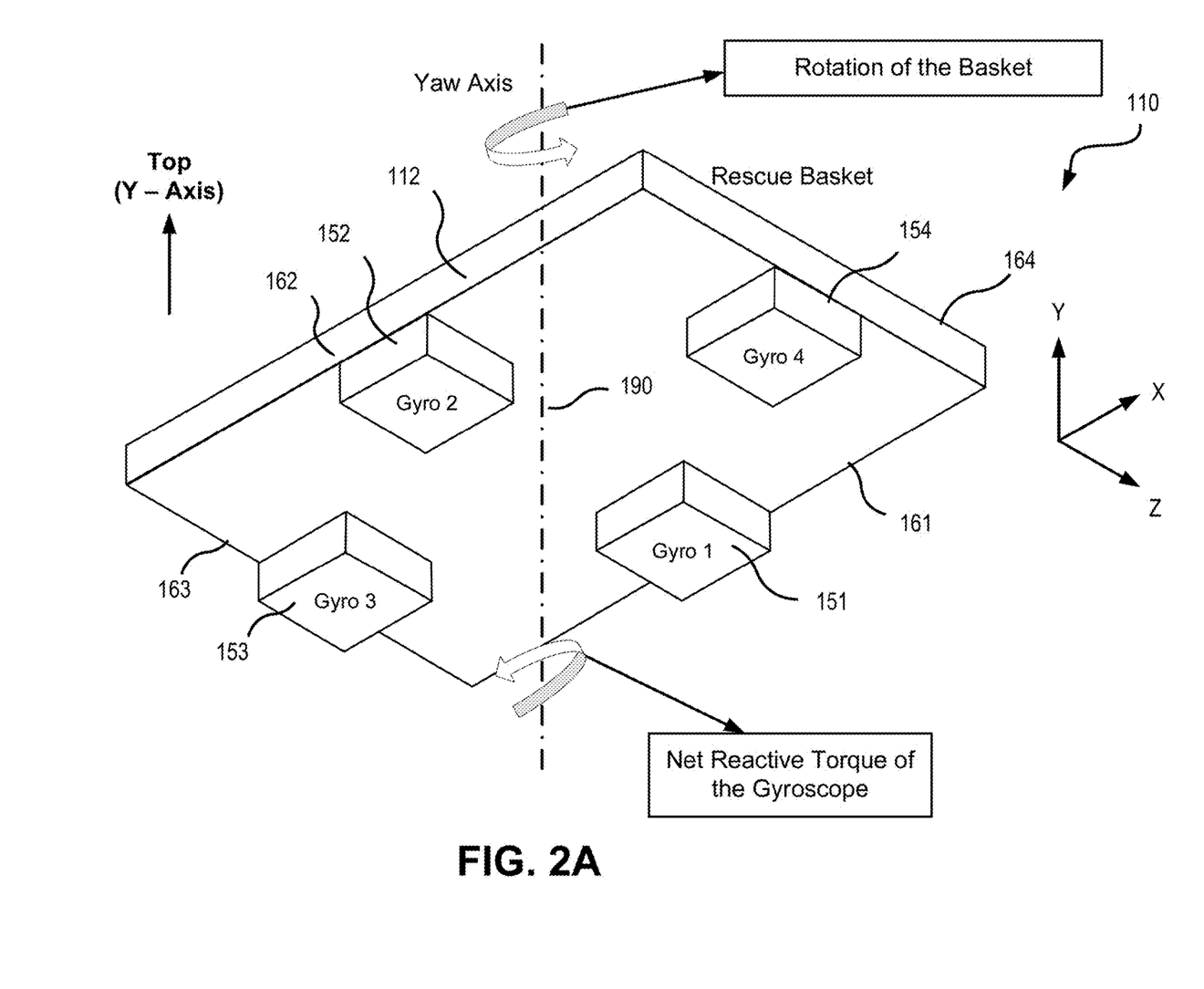
FIG. 2A, FIG. 2B, FIG. 2C, and FIG. 2D illustrate a perspective view, a bottom view, a side view, and a front view, respectively, of a patient litter basket assembly including a four gyroscope design in accordance with various embodiments of the present disclosure.
Figure 2B:
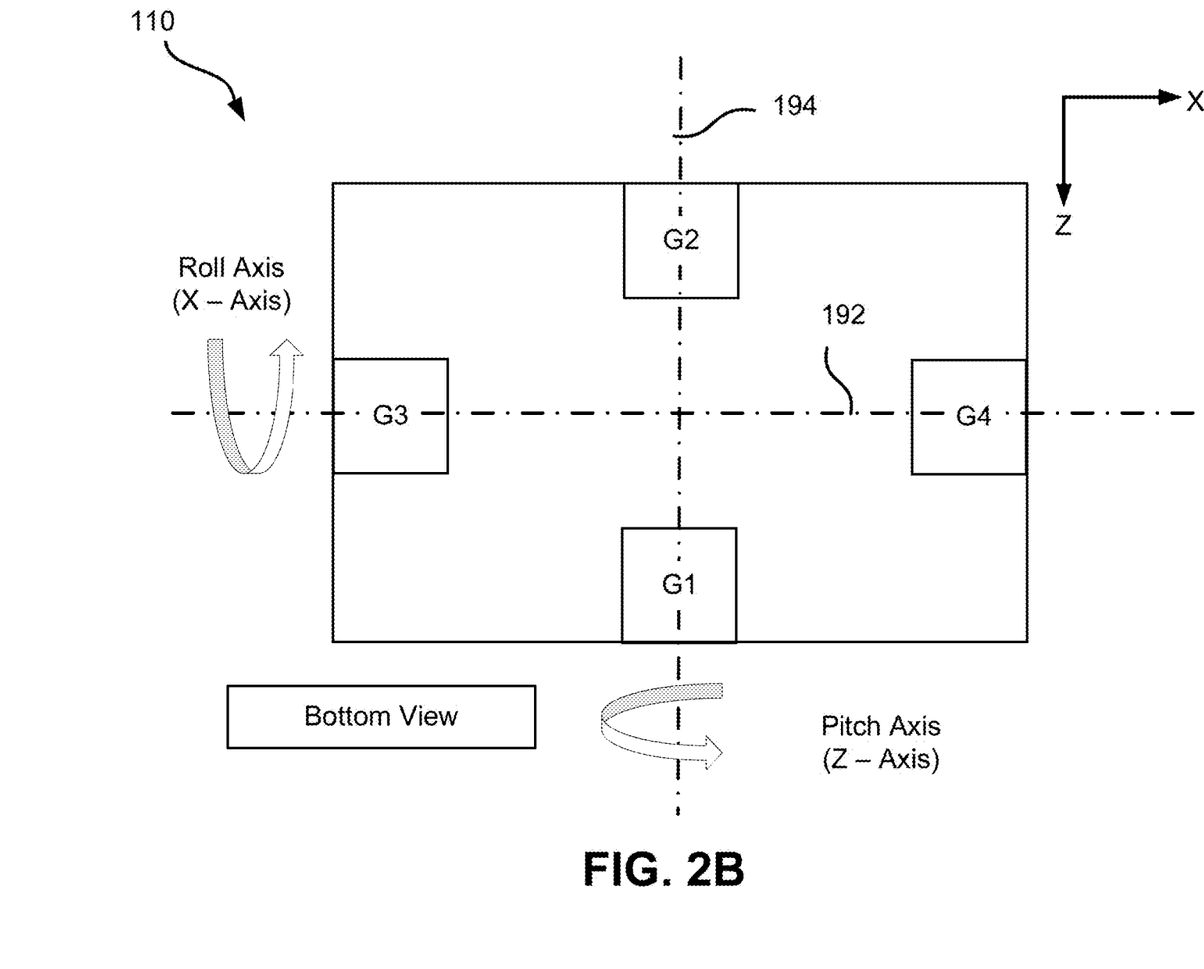
Figure 2C:
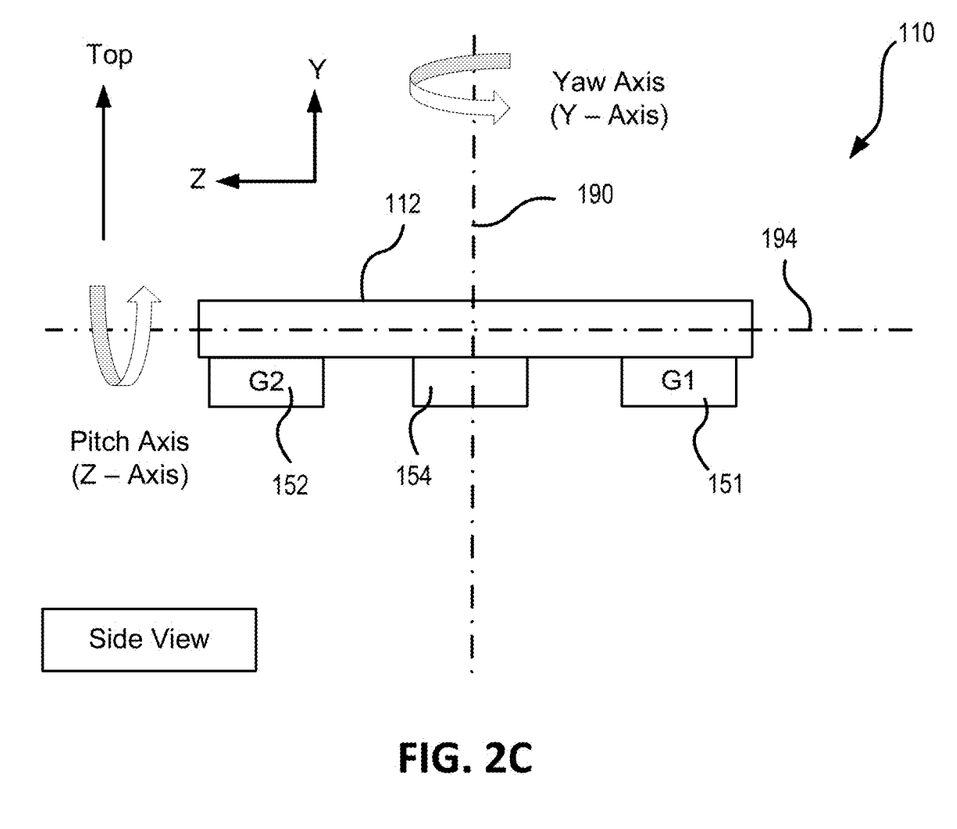
Figure 2D:
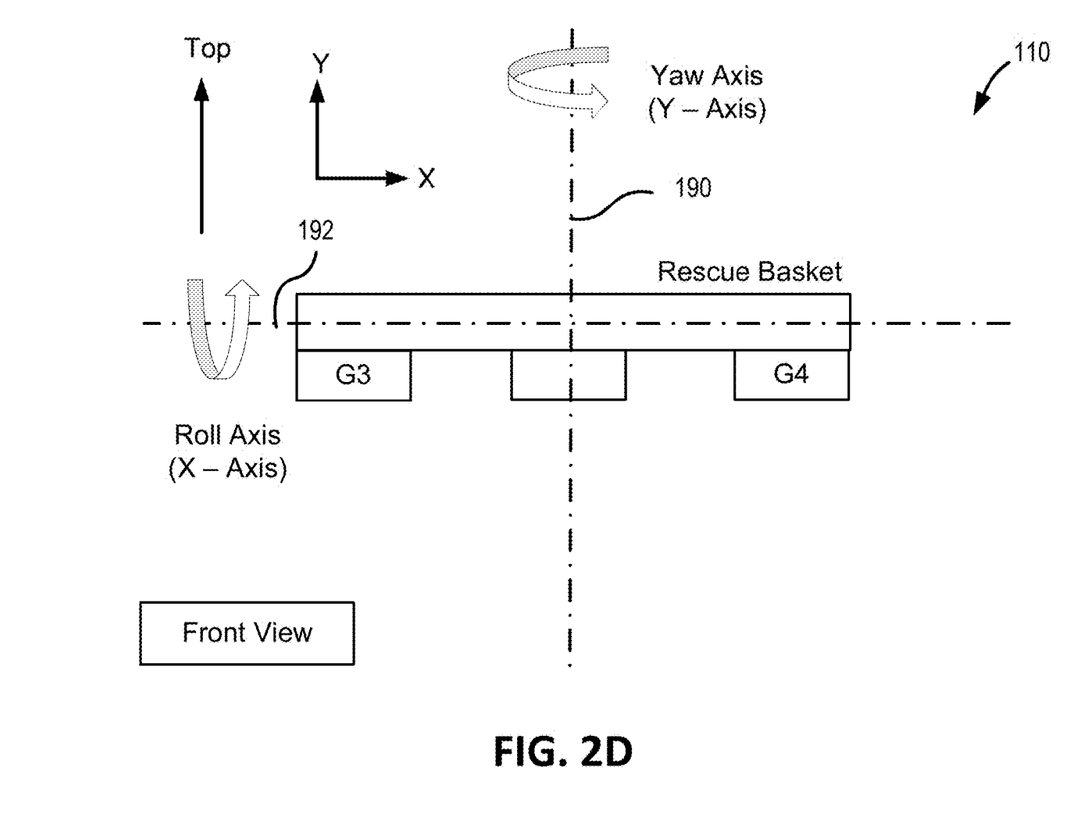

In various embodiments, the main control system 301 is in operable communication with each gyroscope in the plurality of gyroscopes (e.g., gyroscopes 351, 352, 353, 354). With momentary reference to FIG. 3A, during operation of control system 300, motion sensor 306 may detect an angular acceleration of patient litter basket 112 about yaw axis 190. In response to motion sensor 306 detecting an angular acceleration beyond a predetermined threshold angular acceleration, controller 302 may activate the gyroscopes (e.g., gyroscopes 351, 352, 353, 354) to counter act the torque of patient litter basket 112 by applying appropriate gyroscopic torque. For example, if patient litter basket 112 is rotating about yaw axis 190 in a first rotational direction, controller 302 may activate the gyroscopes (e.g., gyroscopes 351, 352, 353, 354) to counter act the torque of patient litter basket 112 by applying gyroscopic torque in a second rotational direction opposite the first rotational direction to slow the rotation of the patient litter basket 112 in the first rotational direction. In various embodiments, the controller 302 may modulate the counter torque of the gyroscopes so that the counter torque counters the rotational movement of the patient litter basket 112 to stabilize the patient litter basket 112 by preventing the spin.

In various embodiments, each gyroscope 351, 352, 353, 354 includes a flywheel 371, 372, 373, 374, respectively, which can be activated by rotating the flywheel about an axis to apply gyroscopic torque in a desired direction. Main control system 301 may activate the gyroscopes and stabilize the patient litter basket 112 upon reaching the threshold angular acceleration, for example as per the logic referred in table 1. In various embodiments, each gyroscope is capable of producing torque in the range of 35 to 100 N-m. In various embodiments, each gyroscope is capable of producing torque sufficient to slow an angular acceleration of the patient litter basket 112 and the particular torque value may vary based on the positioning of the gyroscope with respect to the rotational axis and the overall mass of the patient litter basket 112.

With reference to FIG. 4A through FIG. 4D, various schematic views of a patient litter basket assembly 410 including a patient litter basket 112 with a two gyroscope based configuration are illustrated, in accordance with various embodiments. In various embodiments, patient litter basket assembly 410 may be similar to patient litter basket assembly 110 of FIG. 2A through FIG. 2D. With respect to FIGS. 4A through FIG. 4D, elements with like element numbering, as depicted in FIG. FIGS. 2A through FIG. 2D, are intended to be the same and will not necessarily be repeated for the sake of clarity. The control system of patient litter basket assembly 410 may apply corrective forces, being consistent with the below logic to ensure stability at every instant of a rescue operation.

TABLE 2

Gyroscope control logic for yaw axis stabilization

| Gyroscope | Flywheel Rotation Axis, ω | Axis of Precession, $\omega_p$ | Gyroscopic Torque Axis | Reaction Torque on Basket |
|---|---|---|---|---|
| Gyroscope 1 | +X | +Z | −Y | −Z |
| Gyroscope 2 | −X | −Z | −Y | +Z |
| Net Torque/Moment | 0 | 0 | −2Y | 0 |

The objective of stabilizing the patient litter basket 112 may also be achieved with the use of two gyroscopes. The stability logic explained for the four gyroscope configuration is consistent for the two gyroscope configuration as well. A two gyroscope layout may ensure stabilization solution tailored for a rotor downwash scenario. Having two gyroscopes may help to reduce the overall weight of the system with respect to a four gyroscope configuration. A two gyroscope configuration may tend to be more suitable for mid to low risk applications.

Figure 5:
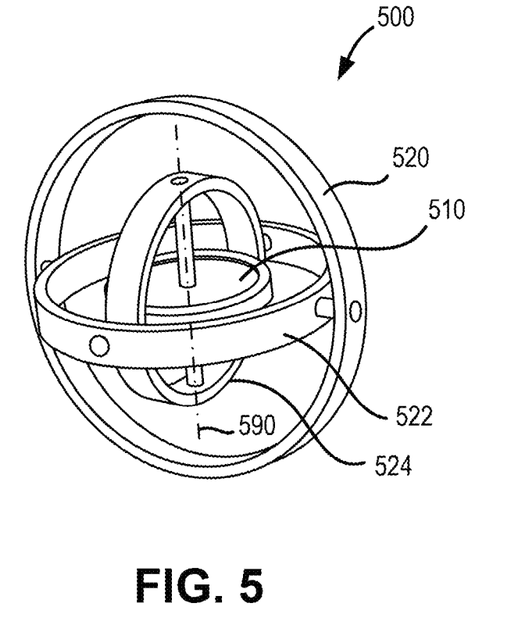
FIG. 5 illustrates an exemplary gyroscope design in accordance with various embodiments.

With reference to FIG. 5, an example gyroscope 500 is illustrated, in accordance with various embodiments. Gyroscopes 40 of FIG. 1, and/or gyroscopes 151, 152, 153, 154 of FIG. 2A may be similar to gyroscope 500. Gyroscope 500 includes a flywheel 510 rotatable about a flywheel rotation axis 590. In operation, flywheel 510 is powered (e.g., by a motor) to rotate about flywheel rotation axis 590 to impart a torque that is generally orthogonal to the flywheel rotation axis 590 and proportional to the inertia and the rotational speed of the spinning mass (i.e., flywheel 510). Flywheel 510 may be mounted rotatably mounted to a frame 520. In various embodiments, flywheel 510 is rotatably mounted to frame 520 via a first gimbal 522, whereby an orientation of flywheel 510 is variable to change the direction of torque output by gyroscope 500. In various embodiments, flywheel 510 is rotatably mounted to frame 520 via a second gimbal 524, whereby an orientation of flywheel 510 is further variable to change the direction of torque output by gyroscope 500. In various embodiments, flywheel 510 is rotatably mounted to second gimbal 524, which is rotatably mounted to first gimbal 522, which is in turn rotatably mounted to frame 520. In this manner, flywheel 510 may be rotatable in three dimensions. However, it is contemplated herein that a gyroscope of the present disclosure may have a flywheel rotatable about a fixed axis, in accordance with various embodiments. Furthermore, a gyroscope of the present disclosure may have a flywheel rotatable in only two dimensions. The variability of the flywheel may be based upon the axis about which stabilization is desired. For example, if stabilization is desired only about the yaw axis, a gyroscope having a flywheel configured to rotate about a single axis may be sufficient. However, if stabilization is desired about roll and pitch axes, a gyroscope having a flywheel configured to rotate about a three different axes may be provided. Moreover, multiple gyroscopes having a flywheel configured to rotate about a single axis, but each oriented in a different direction, may be provided to give multi-axis stabilization, in accordance with various embodiments.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A patient litter basket spin control assembly comprising:
   a base of the litter basket;
   a plurality of sidewalls extending perpendicular from the base of the litter basket to form a patient space for containing a patient;
   a first gyroscope disposed at least partially within a first sidewall of the litter basket and comprising a first flywheel rotatably mounted to a second gimbal, which is rotatably mounted to a first gimbal, which is rotatably mounted to a first frame such that the first flywheel is rotatable in three dimensions;
   a second gyroscope disposed at least partially within a second sidewall of the litter basket and comprising a second flywheel rotatably mounted to a fourth gimbal, which is rotatably mounted to a third gimbal, which is rotatably mounted to a second frame such that the second flywheel is rotatable in three dimensions; and
   a motion sensor for sensing an angular acceleration of the patient litter basket, the first gyroscope configured to rotate the first flywheel about a first flywheel rotation axis and the second gyroscope to rotate the second flywheel about a second flywheel rotation axis to generate a gyroscopic torque as a counter torque in a rotational direction to slow the angular acceleration of the patient litter basket.

2. The patient litter basket spin control assembly of claim 1, further comprising a controller associated with the first gyroscope and associated with an onboard computer of an aircraft.

3. The patient litter basket spin control assembly of claim 1, wherein the first gyroscope and the second gyroscope form a first gyroscope pair configured to be simultaneously activated to generate the counter torque.

4. The patient litter basket spin control assembly of claim 3, wherein the first gyroscope and the second gyroscope are configured to be coupled opposite each other with respect to the patient litter basket.

5. The patient litter basket spin control assembly of claim 4, further comprising a second gyroscope pair comprising a third gyroscope and a fourth gyroscope, wherein the first gyroscope and the second gyroscope are configured to be disposed at opposite ends of the patient litter basket and the third gyroscope and the fourth gyroscope are configured to be disposed at opposite sides of the patient litter basket.

6. The patient litter basket spin control assembly of claim 5, wherein the second gyroscope pair is configured to be located substantially midway between a first end and a second end of the patient litter basket.

7. The patient litter basket spin control assembly of claim 1, further comprising a power source associated with the first gyroscope.

8. The patient litter basket spin control assembly of claim 1, wherein the first frame is a circular frame surrounding the first gimbal in a first plane, the first gimbal is a first circular gimbal surrounding the second gimbal in a second plane, and the second gimbal is a second circular gimbal surrounding the first flywheel in a third plane, and wherein the first flywheel is rotatable in three dimensions with respect to the first frame.

9. A patient litter basket assembly comprising:
a litter basket having a base and a plurality of sidewalls extending perpendicular to the base, the litter basket configured to be raised and lowered by a helicopter using a cable;
a first gyroscope pair disposed at least partially within the sidewalls of the litter basket comprising a first gyroscope with a first flywheel rotatable in three dimensions and a second gyroscope with a second flywheel rotatable in three dimensions; and
a motion sensor for sensing an angular acceleration of the litter basket, the first gyroscope pair configured to rotate the first flywheel about a first flywheel rotation axis and the second gyroscope to rotate the second flywheel about a second flywheel rotation axis to generate a gyroscopic torque as a counter torque in a rotational direction to slow the angular acceleration of the litter basket.

10. The patient litter basket spin control assembly of claim 9, further comprising a second gyroscope pair comprising a third gyroscope and a fourth gyroscope.

11. The patient litter basket spin control assembly of claim 10, wherein the third gyroscope and the fourth gyroscope are configured to be disposed at opposite sides of the litter basket.

12. The patient litter basket spin control assembly of claim 10, wherein the third gyroscope comprises a third flywheel configured to rotate about a third flywheel rotation axis;
the fourth gyroscope comprises a fourth flywheel configured to rotate about a fourth flywheel rotation axis in a rotational direction opposite the third flywheel; and
the third flywheel rotation axis is parallel to the fourth flywheel rotation axis.

13. The patient litter basket spin control assembly of claim 9, wherein the first gyroscope and the second gyroscope are configured to be disposed at opposite ends of the litter basket.

14. The patient litter basket spin control assembly of claim 9, wherein the second flywheel is configured to rotate in a rotational direction opposite the first flywheel; and
the first flywheel rotation axis is parallel to the second flywheel rotation axis.

15. The patient litter basket spin control assembly of claim 9, further comprising a power source for powering the first gyroscope and the motion sensor.

16. The patient litter basket spin control assembly of claim 9, wherein at least one of the first gyroscope and the second gyroscope is mounted to a sidewall of the litter basket.

17. The patient litter basket spin control assembly of claim 10, wherein at least one of the third gyroscope and the fourth second gyroscope is mounted to a base of the litter basket.

18. A patient litter basket spin control assembly comprising:
a base of the litter basket;
a plurality of sidewalls extending perpendicular from the base of the litter basket to form a patient space for containing a patient;
a first gyroscope disposed at least partially within a first sidewall of the litter basket and comprising a first flywheel rotatably mounted to a second circular gimbal, which is rotatably mounted to a first circular gimbal, which is rotatably mounted to a first circular frame such that the first flywheel is rotatable in three dimensions with respect to the first circular frame, such that the first circular frame surrounds the first circular gimbal in a first plane, such that the first circular gimbal surrounds the second circular gimbal in a second plane, and such that the second circular gimbal surrounds the first flywheel in a third plane;
a second gyroscope disposed at least partially within a second sidewall of the litter basket and comprising a second flywheel rotatably mounted to a fourth gimbal, which is rotatably mounted to a third gimbal, which is rotatably mounted to a second frame such that the second flywheel is rotatable in three dimensions; and
a motion sensor for sensing an angular acceleration of the patient litter basket, the first gyroscope configured to rotate the first flywheel about a first flywheel rotation axis and the second gyroscope to rotate the second flywheel about a second flywheel rotation axis to generate a gyroscopic torque as a counter torque in a rotational direction to slow the angular acceleration of the patient litter basket.

* * * * *